(12) United States Patent
Yamadera et al.

(10) Patent No.: US 7,347,903 B2
(45) Date of Patent: Mar. 25, 2008

(54) DUPLEX STAINLESS STEEL FOR UREA MANUFACTURING PLANTS

(75) Inventors: Yoshimi Yamadera, Kobe (JP); Eiki Nagashima, Chiba (JP)

(73) Assignees: Sumitomo Metal Industries, Ltd., Osaka (JP); Toyo Engineering Corporation, Tokyo (JP)

( * ) Notice: Subject to any disclaimer, the term of this patent is extended or adjusted under 35 U.S.C. 154(b) by 628 days.

(21) Appl. No.: 10/352,997

(22) Filed: Jan. 29, 2003

(65) Prior Publication Data

US 2003/0155046 A1    Aug. 21, 2003

(30) Foreign Application Priority Data

Feb. 5, 2002    (JP) ............................. 2002-027695

(51) Int. Cl.
  *C22C 38/44*    (2006.01)
(52) U.S. Cl. ................. 148/327; 148/325; 420/52; 420/57; 420/59; 420/65; 420/67
(58) Field of Classification Search ................. 420/52, 420/57, 59, 67, 65; 148/325, 327
  See application file for complete search history.

(56) References Cited

U.S. PATENT DOCUMENTS 5,582,656 A * 12/1996 Kangas et al. ............... 148/325
6,312,532 B1 * 11/2001 Kangas ......................... 148/325

FOREIGN PATENT DOCUMENTS

| EP | 0 220 141 A2 | 4/1987 |
| EP | 0545753 | 11/1992 |
| EP | 0 534 864 A1 | 3/1993 |
| EP | 0 545 753 A1 | 6/1993 |
| EP | 0777756 B1 * | 6/1997 |
| EP | 0 937 783 A1 | 8/1999 |
| EP | 0937783 | 8/1999 |
| JP | 2001-9589 A | 1/2001 |
| JP | 2001009589 | 1/2001 |
| WO | WO95/00674 | 1/1995 |
| WO | 0164386 | 9/2001 |
| WO | WO 01/64386 A1 | 9/2001 |

* cited by examiner

*Primary Examiner*—Deborah Yee
(74) *Attorney, Agent, or Firm*—Clark & Brody

(57) ABSTRACT

A duplex stainless steel for use in urea manufacturing plants, in mass %, consisting of C: 0.03% or less, Si: 0.5% or less, Mn: 2% or less, P: 0.04% or less, S: 0.003% or less, Cr: 26% or more, but less than 28%, Ni: 6-10%, Mo: 0.2-1.7%, W: more than 2%, but no more than 3%, N: more than 0.3%, but no more than 0.4%, with the balance being Fe and impurities, in which the content of Cu as an impurity is not more than 0.3%. The duplex stainless steel may also have Ca, Ce, and B content, and it is desirable that levels of Al and O (oxygen) as an impurities be no more than 0.05% and 0.01% respectively. Further, it is preferable that an increase in the Vickers hardness of the steel should not be more than 80, before and after the solution treated steel is subjected to the heat treatment of 800° C. for 30 minutes and subsequent water cooling. This duplex stainless steel possesses a high corrosion resistance.

15 Claims, 1 Drawing Sheet

DUPLEX STAINLESS STEEL FOR UREA MANUFACTURING PLANTS

BACKGROUND OF THE INVENTION

1. Field of the Invention

This invention relates to a duplex stainless steel for use in urea manufacturing plants. This duplex stainless steel has a high corrosion resistance in environments where construction materials of urea manufacturing plants are exposed.

2. Description of the Prior Art

Materials used in the construction of various chemical plants are required to have sufficient strength and also a high corrosion resistance. Particularly, in a urea manufacturing plant, an intermediate material called ammonia-carbamate is produced which is highly corrosive, and therefore the materials used in the construction of the plant are required to have excellent corrosion resistance. Until now, austenitic stainless steels such as JIS SUS316, SUS317, and SUS310 have often been used as these materials.

Duplex stainless steel, comprising a ferrite phase and an austenite phase, is inexpensive and also superior to austenitic stainless steel in corrosion resistance. Therefore, SUS329-type duplex stainless steels are often used in the construction of urea manufacturing plants.

A typical duplex stainless steel is Ni—Cr—Mo—N steel defined by SUS329 J3L or SUS329 J4L. Duplex stainless steels, which are derived from the steels mentioned above, have been improved on corrosion resistance and other properties for use in the construction of urea manufacturing plants. Some of these steels are proposed as described below.

In Japanese Patent Laid Open No. 08-511829, a duplex stainless steel is proposed for specific use in urea manufacturing plants. This duplex stainless steel contains as principal alloy components Ni: 3-10%, Cr: 28-35%, Mo: 1.0-4.0%, and N: 0.2-0.6%, exhibiting a high corrosion resistance in the Huey test. According to the description of the aforementioned publication, a maximum of 2% W content is allowable, but no W-containing steel is actually disclosed. Furthermore, it recommends that the content of W should be kept to the minimum because it is an element that accelerates the precipitation of an intermetallic phases. It goes on to say that the steel should be comprised of 28% or more of Cr content from the viewpoint of corrosion resistance, and that no more than 1.0% of Cu content may be allowed in the steel.

A problem with duplex stainless steel is the formation of a sigma (σ) phase. A sigma phase is an intermetallic phases formed when steel is heated to a temperature of approximately 600°-850° C. Once a sigma phase is formed, the hardness of the steel increases, which makes the steel brittle and deteriorates corrosion resistance. There are heat-affected zone ("HAZ" for short) due to welding or hot bending in constituent materials of plants. If a sigma phase is formed therein, a steel's corrosion resistance is weakened in a local portion. The corrosion resistance of the heat-affected zone varies depending on the amount of sigma phase precipitation in the steel. If the amount of the sigma phase precipitation increases, the corrosion resistance of the heat-affected zone deteriorates proportionately. Therefore, the design of an alloy which prevents formation of a sigma phase in duplex stainless steel used in heat-affected zones is very important.

Steel pipes and steel plates are usually used as constituent members in a urea manufacturing plant. These steel pipes and steel plates are produced by hot working such as forging, extrusion or rolling, and with or without subsequent cold working. The ferrite content of duplex stainless steel increases with a rise in the heating temperature used in hot working, and ridging occurs due to a non-uniform deformation of ferrite grains in the subsequent working. As a result, a wrinkle flaw forms on the surface of the product.

Particularly, as a duplex stainless steel proposed in Japanese Patent Laid Open No. 08-511829 has a high Cr content, the increase of ferrite content is accelerated by heating. Therefore, it is necessary to design an alloy that also suppresses ferrite content in order to prevent ridging.

A duplex stainless steel disclosed in U.S. Pat. No. 6,312,532, has an excellent hot workability, a high corrosion resistance in a chloride environment or in an acid solution, and an excellent microstructural stability. Its principal alloy components are Ni 3.0-10.0%, Cr 27.0-35.0%, Mo 0-3.0%, W 2.0-5.0%, Cu 0.5-3.0%, and N 0.30-0.55%. This duplex stainless steel contains Cu and W to allow for corrosion resistance and mechanical properties. However, Cu forms complex ions in cooperation with the ammonia existing in urea and accelerates corrosion. Therefore, this steel does not possess sufficient corrosion resistance for use in a urea manufacturing plant. This issue will be described later in detail.

SUMMARY OF THE INVENTION

The first purpose of the present invention is the provision of a duplex stainless steel for use in urea manufacturing plants, which has superior strength and corrosion resistance; prevents formation of a sigma phase even if steel is exposed to above mentioned heat histories in the heat-affected zones; and has good surface properties in hot working.

The second purpose of the present invention is to provide a urea manufacturing plant using the above duplex stainless steel.

The duplex stainless steel of the present invention is comprised of the elements mentioned below. In the following description, all percentages "%" of the content of elements indicate "mass %."

A duplex stainless steel for use in urea manufacturing plants, consisting of C: 0.03% or less, Si: 0.5% or less, Mn: 2% or less, P: 0.04% or less, S: 0.003% or less, Cr: 26% or more, but less than 28%, Ni: 6-10%, Mo: 0.2-1.7%, W: more than 2%, but no more than 3%, N: more than 0.3%, but no more than 0.4%, with the balance being Fe and impurities, in which the content of Cu as an impurity is not more than 0.3%.

In the duplex stainless steel of the present invention, a part of the Fe content may be substituted with one or more of Ca: 0.0001-0.01%, Ce: 0.0001-0.07%, and B: 0.0001-0.01%. It is preferable that the contents of Al and O (oxygen) included in the impurities be not more than 0.05% and 0.01%, respectively. It is most preferable that an increase in steel hardness calculated by the following equation is not more than 80.

$$\Delta Hv = Hv1 - Hv2$$

where Hv1 represents Vickers hardness of the steel as solution treated which is subjected to the heat treatment of 800° C. for 30 minutes and subsequent water cooling. Hv2 represents Vickers hardness of the steel as solution treated.

Urea manufacturing plants according to the present invention is characterized in that at least one of stripper pipe, condenser pipe, reactor, and piping is manufactured from the above duplex stainless steel of the invention.

DETAILED DESCRIPTION OF THE INVENTION

An initial feature of the duplex stainless steel of the present invention is that the content of Cu is limited to 0.3% or less. Another feature is that the content of W is increased while Mo is minimized. These features are described below.

(1) Limitation of Cu

Cu is preferably added to a duplex stainless steel in order to improve acid resistance and textural stability. For example, 0.5-3.0% of Cu must be included in the steel disclosed in the U.S. Pat. No. 6,312,532.

The present inventors have examined how Cu would influence the corrosion resistance of duplex stainless steels in the corrosive environment of a urea manufacturing plant. The following Fe-based steels (A to D) of differing Cu content were used:

| Steel A | a duplex stainless steel consisted of Cr:27%, Mo:1.0%, W:2.2%, Ni:7.5%, Cu:0.1%, and impurities |
|---|---|
| Steel B | a duplex stainless steel consisted of Cr:27%, Mo:1.0%, W:2.3%, Ni:7.3%, Cu:0.3%, and impurities |
| Steel C | a duplex stainless steel consisted of Cr:27%, Mo;1.1%, W:2.0%, Ni:7.3%, Cu:0.7%, and impurities |
| Steel D | a duplex stainless steel consisted of Cr:27%, Mo:1.0%, W:2.2%, Ni:7.7%, Cu:1.4%, and impurities |

10 mm-thick hot-rolled steel plates of the above steels were subjected to a solution heat treatment, involving heating at 1100° C. for 5 minutes and subsequent cooling with water. The steels were then dipped in a stripper of a pilot tester which simulates a urea manufacturing plant for 500 hours, and were later checked for corrosion rate. The results are shown in FIG. 1.

Figure 1:
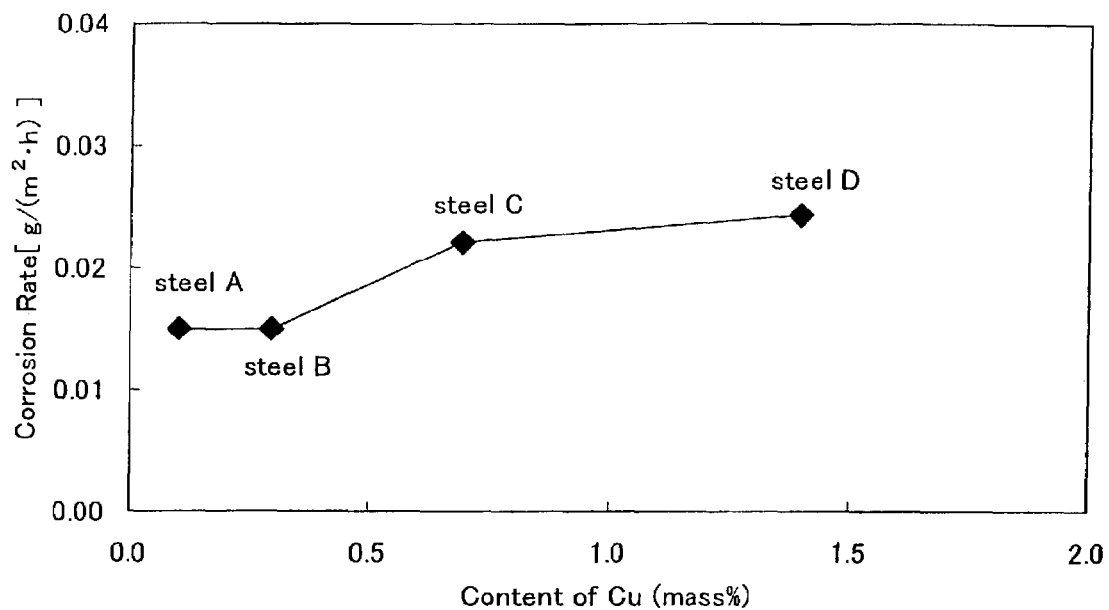
FIG. 1 is a diagram showing results obtained by subjecting duplex stainless steels with differing Cu content to a stripper immersion test, using a pilot tester that simulates a urea manufacturing plant.

As shown in FIG. 1, the corrosion rate is constant (about 0.015 g/m²·h) in the case of steels A and B, which have Cu content of 0.1% and 0.3%, respectively. However, in the case of steel C which has a Cu content of 0.7%, the corrosion rate increases to about 0.023 g/m²·h. From this, it is seen that Cu is an element that accelerates corrosion in the corrosive environment of a urea manufacturing plant, although Cu can be said to generally contribute to the improvement of corrosion resistance. The presumed reason for this is that Cu, which is in a state of a solid-solution, is eluted into liquid in the corrosive environment of a urea manufacturing plant, even if the Cu content is only a trace amount.

(2) Limitation of Mo and Utilization of W

Ferrite stabilizing elements such as Cr and Mo accelerate the formation of a sigma phase. Since these are basic elements needed to maintain the corrosion resistance of a duplex stainless steel, it is impossible to decrease their content excessively. Taking this into account, the present inventors have discovered an alternative by substituting Mo with W (which is similar to Mo in function and effect) and have examined in detail the influence of Mo and W on the formation of a sigma phase.

The amount of a sigma phase precipitation can be estimated in terms of increasing the degree of hardness. For this reason, the following test was conducted.

Fe-based steels (E, F, and G), which have different chemical compositions, were used as test samples of Duplex stainless steels. These samples were subjected to a conventional solution treatment (water-cooling from a heated state of 1100° C.) in order to transform them into solid-solution state, and a heat treatment (heating temperature: 800° C., heating time: 30 minutes, cooling condition: water-cooling) that simulated a heat-affected zone. This heat treatment will hereon be referred to as the "HAZ treatment".

A change in Vickers hardness, between the state subjected to the solution treatment, and the state subjected to the HAZ treatment after the solution treatment, was calculated by the following equation:

$$\Delta Hv = Hv1 - Hv2$$

where Hv1 represents Vickers hardness of the steel as solution treated and subjected to the HAZ treatment, and Hv2 represents Vickers hardness of the steel as solution treated (a state of the steel is solid-solution).

| Steel E | a duplex stainless steel consisted of Cr:27%, Mo:0.8%, W:2.8%, Ni:7.5%, and impurities |
|---|---|
| Steel F | a duplex stainless steel consisted of Cr:27%, Mo:1.6%, W:2.2%, Ni:7.5%, and impurities |
| Steel G | a duplex stainless steel consisted of Cr:27%, Mo:2.3%, W:2.1%, Ni:8.0%, and impurities |

Figure 2:
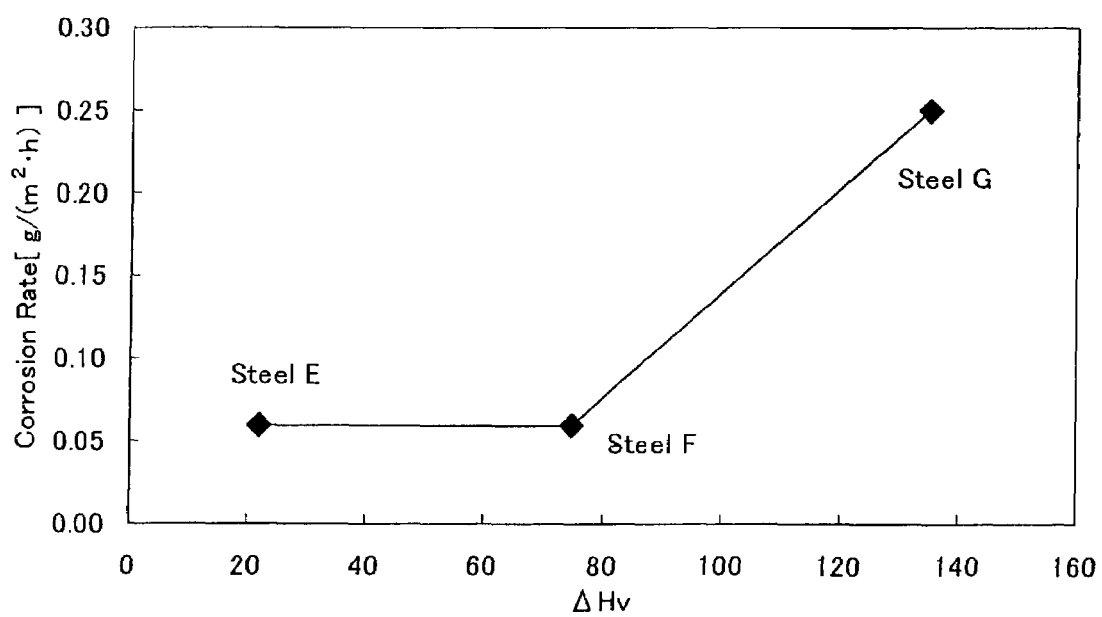
FIG. 2 is a diagram showing a relation between the amount of increase in Vickers hardness (ΔHv) and the corrosion rate observed when duplex stainless steels were subjected to heat treatment that simulates a heat-affected zone.

FIG. 2 shows a relation between the difference in Vickers hardness (ΔH) before and after the HAZ treatment, and the corrosion rates of steels after the HAZ treatment as examined in a test defined by JIS G0573 (a 65% nitric acid corrosion test for stainless steel . . . corresponding to the Huey test).

As shown in the figure, Steel E's hardness increases by about 20 and Steel F's by about 75, but Steel G's reaches about 140. The corrosion rates of steels E and F are kept almost constant at about 0.06 g/(m²·h), thus proving a high corrosion resistance. From these results, it can be concluded that it is possible to maintain a high corrosion resistance up to an increase in hardness (ΔHv) of 80, but that a deterioration of corrosion resistance occurs if ΔHv exceeds 80.

The above differences of ΔHv based on steel type, and the resulting difference in corrosion resistance are attributable to different chemical composition, or more specifically the difference in the content of Mo and W This means that it is important to select the content of each component so that the increase in hardness (ΔHv) before and after the HAZ treatment reaches no more than 80. Therefore steel of a high corrosion resistance can be produced, even if the steel concerned undergoes a heat history such as that in a heat-affected zone.

Next, the present inventors have made a detailed investigation into the wrinkle flaw which occurs during a hot working of a duplex stainless steel. The ferrite content in the duplex stainless steel increases with a rise in the heating temperature, and in a subsequent working ridging is caused by a non-uniform deformation of ferrite grains, with consequent formation of a wrinkle flaw on the surface of the product.

The present inventors examined the ferrite content in heating according to the chemical composition of steel, and made a new discovery. Specifically, the Cr content greatly influences the ferrite content during heating, in a duplex stainless steel that contains W instead of a part of Mo. Therefore, it is necessary to adjust the Cr content to an appropriate amount to allow working that does not cause wrinkle flaws.

The present invention has been accomplished by adjusting the proportion of elements in respective appropriate amounts, based on the above discovery. Functions and effects of elements and reasons for limitations on their content are described below.

C: 0.03% or Less

C is an austenite forming element, which is effective in improving strength. However, if its content is too high, the corrosion resistance will deteriorate due to precipitation of carbides in a heat-affected zone. In the present invention C is defined as an impurity, and an allowable upper limit was therefore set at 0.03%. It is preferable that the content of C is as low as possible within the upper limit.

Si: 0.5% or Less

Si is an element which is effective in the deoxidation of molten steel. However, if its content is too high, corrosion resistance will deteriorate. Therefore, its content should not be more than 0.5% although it may be added as a deoxidizer during steel production. Its content may be an impurity level.

Mn: 2% or Less

Mn is also effective in the deoxidation of molten steel, but if its content exceeds 2%, corrosion resistance will deteriorate. Therefore, the content of Mn should not be higher than 2%. A lower limit thereof may be an impurity level.

P: 0.04% or Less

P is an impurity which exerts a bad influence on hot workability and mechanical properties of steel. Further, in a stainless steel, it causes deterioration of the corrosion resistance by grain boundary segregation. 0.04% is an allowable upper limit as an impurity. The content of P should be as low as possible within the upper limit.

S: 0.003% or Less

S is also an impurity which exerts a bad influence on the workability, etc. of steel. S causes a deterioration of corrosion resistance of a stainless steel by grain boundary segregation, in the same manner as P. Therefore, it is preferable that the content of S is as possible as within 0.003%.

Cr: 26% or More, but Less than 28%

Cr is a ferrite forming element, which is one of the basic components of a duplex stainless steel for improving corrosion resistance. If its content is less than 26%, corrosion resistance will be unsatisfactory in a severely corrosive environment such as a urea manufacturing plant. On the other hand, an excess content will result in increased precipitation of a sigma phase when the steel is subjected to heat history similar to that of a heat-affected zone, and steel hardness will increase. Therefore, corrosion resistance in the heat-affected zone will deteriorate. If Cr content is 28% or more, ridging caused by a non-uniform deformation of ferrite grains during hot working will occur. As a result, there will be a wrinkle flaw on the surface of the product, leading to a lower yield. For this reason, the Cr content was set at 26% or more, but no more than 28%.

Ni: 6-10%

Ni is an austenite forming element and is a main alloy component which brings about a duplex microstructure. Further, it is an effective element for improving both toughness and corrosion resistance. These both will be insufficient if its content is less than 6%. On the other hand, an excess Ni content will accelerate the formation of a sigma phase and will deteriorate corrosion resistance in a heat-affected zone. In the present invention, therefore, the upper limit of the Ni content was set at 10%.

Mo: 0.2-1.7%

Mo is a ferrite forming element, and is used as an alloy component which improves pitting resistance of a duplex stainless steel. However, as mentioned above, Mo is a component which accelerates the formation of a sigma phase. If its content is about 2% or more, deterioration of corrosion resistance is inevitable, as it is caused by the precipitation of a sigma phase when the steel is exposed to heat history similar to that of a heat-affected zone. In the present invention, therefore, Mo is limited to the minimum required content, and a relatively large amount of W is used instead of Mo. This reason is that the use of W also exhibits improved corrosion resistance, but is less active in forming a sigma phase.

The minimum content of Mo is 0.2%, and the maximum of 1.7% allows for suppression of the precipitation of a sigma phase, keeping in mind the addition of W.

W: More than 2%, but no More than 3%

W is also a ferrite forming element like Mo, and is a component which improves the corrosion resistance of a duplex stainless steel in coexistence with Mo. Therefore, the addition of W to a duplex stainless steel has been proposed. For example, in the invention disclosed in Japanese Patent Laid Open No. 08-511829, W content is suggested to a maximum of 2.0%, but no W-containing steel is actually disclosed therein. Rather it is suggested therein that the addition of W should be avoided because it accelerates the precipitation of an intermetallic phases. In other words, there is no suggestion of using large quantities of W as a part-substitute for Mo.

In the invention disclosed in U.S. Pat. No. 6,312,532, part of the Mo content is substituted with W, but a combined addition of W and 0.5-3.0% Cu is essential for suppressing the precipitation of an intermetallic phases. However, in a urea manufacturing plant Cu is a harmful element which forms complex ions in cooperation with ammonia present within a urea solution, and accelerates corrosion as noted previously. Therefore, its addition should be avoided. One of the great features of the present invention is the suppression of the content of harmful Cu to no more than 0.3%, thereby rendering the level of Cr appropriate and optimizing the levels of Mo and W in suppressing the precipitation of a sigma phase.

In the present invention, W is utilized positively to compensate for the function and effect of Mo. This effect is not obtained with a W content of 2% or less, but an excess addition of W causes precipitation of a sigma phase and therefore the maximum was set at 3%.

N: More than 0.3%, but no More than 0.4%

N is an austenite forming element, which is effective in improving corrosion resistance. This effect will be insufficient if the content of N is 0.3% or less. On the other hand, content exceeding 0.4% will lead to the deterioration of hot workability. For this reason, an appropriate content of N is in the range of more than 0.3%, but no more than 0.4%.

One duplex stainless steel according to the present invention consists of the above components, with the balance being Fe and impurities. Another contains at least one of Ca 0.0001-0.01%, Ce 0.0001-0.07%, and B 0.0001-0.01%, along with the components stated above. All of these additional elements are effective in improving the hot workability of the duplex stainless steel.

If the content of Ca, Ce, and B is less than 0.0001% respectively, the aforementioned effect will be insufficient, but if the content of Ca and Ce respectively exceeds 0.01% and 0.07%, the amount of inclusions in a steel will be larger, with consequent deterioration of the corrosion resistance. B content exceeding 0.01% will also result in deterioration of corrosion resistance. For these reasons it is preferable that the content of Ca, Ce, and B be respectively set in the ranges of 0.0001-0.01%, 0.0001-0.07%, and 0.0001-0.01%.

As for impurities contained in a steel produced according to the present invention, it is preferable that Al and O (oxygen) content is no more than 0.05% and 0.01% respectively. Reasons for the limitations on the respective elements are stated below.

Al forms oxides, which remain in the steel and cause deterioration of the corrosion resistance. It is therefore preferable that the Al content is no more than 0.05% and kept as low as possible. Oxygen forms oxide-based inclusions such as alumina and diminishes the workability and corrosion resistance of a duplex stainless steel, so the content of oxygen should preferably remain 0.01% or less.

In a duplex stainless steel according to the present invention, it is preferable that an increase in steel hardness calculated by the following equation is not more than 80. The reason is as explained previously in connection with FIG. 2.

$$\Delta Hv = Hv1 - Hv2$$

where Hv1 represents Vickers hardness of the steel as solution treated and subjected to the HAZ treatment. Hv2 represents Vickers hardness of the steel as solution treated.

Particularly, the duplex stainless steel according to the present invention is most suitable for stripper pipes, condenser pipes, reactors, and piping in urea manufacturing plants. The welding of these can be carried out using welding material made of the duplex stainless steel of the present invention.

EXAMPLE

Steels of the compositions shown in Table 1 were melted by means of a vacuum induction melting furnace, and were formed into 10 mm-thick steel plates by hot forging and hot rolling. These steel plates were then subjected to a solution heat treatment (heating at 1100° C. for 5 minutes and subsequent cooling with water), and specimens of a predetermined size were cut out and subjected to the following tests. The results obtained are shown in Table 2.

(1) Specimens 10 mm-wide×3 mm-thick×40 mm-long were cut out and subjected to a corrosion test defined by JIS G 0573 (a 65% nitric acid corrosion test for stainless steel) to determine corrosion rates. This test evaluated corrosion resistance after the solution heat treatment.

(2) Specimens 10 mm-wide×3 mm-thick×40 mm-long were cut out and subjected to a 500-hour immersion test in a stripper provided in a pilot tester that simulated conditions in a urea manufacturing plant to determine corrosion rates.

(3) After the solution heat treatment, Specimens 25 mm-wide×12 mm-thick×40 mm-long were cut out and subjected to HAZ treatment (800° C.×30 minutes., water cooling). Thereafter, Vickers hardness was measured and changes in hardness (ΔHv) were determined.

Steels of the compositions shown in Table 1 were melted by a vacuum induction melting furnace, subjected to hot forging, and then molded into round hollow billets. Each billet has an outside diameter of 175 mm, an inside diameter of 40 mm, and a length of 600 mm. The billets were heated to 1200° C., extruded and checked individually for the depth of the wrinkle flaw formed on the product surface. In the evaluation, "○" represents wrinkle flaws with a depth less than 0.3 mm, while "x" represents wrinkle flaws with a depth of 0.3 mm or more.

TABLE 1

| No. | Chemical Composition (mass %, balance Fe and impurities) | | | | | | | | | | | | | |
|---|---|---|---|---|---|---|---|---|---|---|---|---|---|---|
| | C | Si | Mn | P | S | Ni | Cr | Mo | W | N | Cu | Al | O | Others |
| Examples of the Present Invention | | | | | | | | | | | | | | |
| 1 | 0.017 | 0.19 | 0.50 | 0.025 | 0.002 | 8.7 | 26.7 | 0.8 | 2.0 | 0.35 | 0.3 | 0.016 | 0.008 | |
| 2 | 0.017 | 0.22 | 0.51 | 0.021 | 0.002 | 8.3 | 27.5 | 0.8 | 2.8 | 0.30 | 0.1 | 0.020 | 0.008 | |
| 3 | 0.021 | 0.45 | 0.82 | 0.015 | 0.001 | 9.5 | 26.5 | 0.5 | 2.1 | 0.31 | 0.2 | 0.017 | 0.006 | |
| 4 | 0.009 | 0.15 | 0.95 | 0.012 | 0.001 | 7.5 | 26.1 | 1.1 | 2.6 | 0.38 | 0.1 | 0.022 | 0.008 | B:0.009 |
| 5 | 0.014 | 0.20 | 0.53 | 0.021 | 0.001 | 7.4 | 27.6 | 0.7 | 2.3 | 0.35 | 0.3 | 0.015 | 0.006 | Ca:0.0043 |
| 6 | 0.016 | 0.22 | 0.61 | 0.019 | 0.001 | 7.8 | 27.6 | 0.8 | 2.2 | 0.34 | 0.2 | 0.015 | 0.005 | Ca:0.0045, Ce:0.02 |
| 7 | 0.014 | 0.19 | 0.53 | 0.024 | 0.001 | 9.5 | 27.9 | 1.2 | 2.2 | 0.35 | 0.1 | 0.017 | 0.009 | Ca:0.003, Ce:0.02, B:0.005 |
| 8 | 0.015 | 0.19 | 0.52 | 0.021 | 0.002 | 7.6 | 27.6 | 1.5 | 2.2 | 0.36 | 0.2 | 0.010 | 0.007 | Ce:0.03 |
| 9 | 0.018 | 0.21 | 0.52 | 0.021 | 0.002 | 7.6 | 27.8 | 1.5 | 2.2 | 0.34 | 0.2 | 0.008 | 0.009 | Ca:0.0045, B:0.0002 |
| 10 | 0.016 | 0.20 | 0.53 | 0.020 | 0.002 | 7.5 | 27.5 | 1.5 | 2.5 | 0.33 | 0.3 | 0.015 | 0.006 | Ce0.03, B:0.007 |
| Comparative Examples | | | | | | | | | | | | | | |
| 11 | 0.017 | 0.20 | 0.64 | 0.021 | 0.002 | 6.5 | 25.1* | 0.6 | 2.2 | 0.32 | 0.2 | 0.025 | 0.008 | |
| 12 | 0.013 | 0.22 | 0.53 | 0.026 | 0.001 | 8.3 | 28.0* | 1.1 | 2.2 | 0.31 | 0.1 | 0.027 | 0.005 | |
| 13 | 0.013 | 0.21 | 0.65 | 0.026 | 0.002 | 8.3 | 28.7* | 0.9 | 2.8 | 0.32 | 0.1 | 0.022 | 0.006 | |
| 14 | 0.015 | 0.21 | 0.95 | 0.021 | 0.001 | 6.7 | 29.3* | 2.0* | 0.5* | 0.38 | 0.3 | 0.021 | 0.006 | |
| 15 | 0.012 | 0.22 | 0.52 | 0.024 | 0.001 | 7.6 | 27.5 | 1.9* | 2.3 | 0.31 | 0.1 | 0.025 | 0.008 | |
| 16 | 0.019 | 0.44 | 0.89 | 0.023 | 0.001 | 6.5 | 26.5 | 0.8 | 1.9* | 0.32 | 0.2 | 0.022 | 0.009 | |

TABLE 1-continued

| | Chemical Composition (mass %, balance Fe and impurities) | | | | | | | | | | | | | |
|---|---|---|---|---|---|---|---|---|---|---|---|---|---|---|
| No. | C | Si | Mn | P | S | Ni | Cr | Mo | W | N | Cu | Al | O | Others |
| 17 | 0.016 | 0.16 | 0.55 | 0.021 | 0.002 | 6.4 | 26.3 | 0.7 | 2.1 | 0.27* | 0.2 | 0.019 | 0.007 | |
| 18 | 0.013 | 0.14 | 0.90 | 0.021 | 0.002 | 7.2 | 27.8 | 1.0 | 2.8 | 0.35 | 1.5* | 0.020 | 0.008 | |
| 19 | 0.019 | 0.44 | 0.89 | 0.023 | 0.001 | 7.1 | 25.2* | 2.8* | 0.4* | 0.14* | 0.1 | 0.013 | 0.008 | |

The symbol "*" in the table means that the value concerned is outside the scope of the invention.

TABLE 2

| No. | 65% Nitric Acid Corrosion Test Method Corrosion Rate (g/m² · h) | Immersion Test in Urea Manufacturing Plant Stripper** Corrosion Rate (g/m² · h) | Hardness Change by HAZ treatment (Δ Hv) | Product Wrinkle Flaw Criterion | Total Evaluation |
|---|---|---|---|---|---|
| Examples of the Present Invention | | | | | |
| 1 | 0.055 | 0.015 | 25 | ○ | ○ |
| 2 | 0.051 | 0.013 | 52 | — | ○ |
| 3 | 0.054 | — | 15 | — | ○ |
| 4 | 0.057 | — | 35 | ○ | ○ |
| 5 | 0.055 | — | 36 | — | ○ |
| 6 | 0.054 | — | 41 | — | ○ |
| 7 | 0.045 | 0.014 | 70 | ○ | ○ |
| 8 | 0.051 | — | 62 | — | ○ |
| 9 | 0.051 | — | 75 | — | ○ |
| 10 | 0.049 | — | 73 | ○ | ○ |
| Comparative Examples | | | | | |
| 11 | 0.072 | — | 12 | — | ● |
| 12 | 0.052 | 0.014 | 68 | X | ● |
| 13 | 0.051 | — | 88 | X | ● |
| 14 | 0.054 | — | 82 | X | ● |
| 15 | 0.052 | — | 118 | — | ● |
| 16 | 0.069 | — | 28 | ○ | ● |
| 17 | 0.070 | — | 25 | — | ● |
| 18 | 0.056 | 0.022 | 74 | — | ● |
| 19 | 0.068 | 0.019 | 144 | ○ | ● |

**Stripper immersion test in a pilot tester simulative of a urea manufacturing plant In Tables 1 and 2, No. 14 corresponds to the duplex stainless steel of the invention disclosed in Japanese Patent Laid Open No. 08-511829, No. 18 corresponds to the duplex stainless steel of the invention disclosed in U.S. Pat. No. 6,312,532, and No. 19 is a duplex stainless steel corresponding to SUS329J4L.

In Nos. 1 through 10 which are steels according to the present invention, corrosion rates in the above test (1) were lower than 0.068 g/(m²·h), which is the corrosion rate of No. 19 SUS329J4L which is currently in practical use, thus exhibiting a high corrosion resistance. On the other hand, No. 11 and No. 19, in which Cr content is lower than the levels defined in the present invention, have a high corrosion rate and inferior corrosion resistance. Further, No. 16 and No. 17, in which W or N content is lower than that defined in the present invention, have a higher corrosion rate than No. 19's 0.068 g/(m²·h), and are thus unsatisfactory in terms of corrosion resistance.

Also, in the above test (2) the steels according to the present invention have a lower corrosion rate than No. 19's 0.019 g/(m²·h), thus exhibiting an excellent corrosion resistance. On the other hand, No. 18 has 1.5% Cu content, so corrosion is uninhibited and the corrosion rate is high.

All steels No. 1 through 10 produced according to the present invention do not exceed 80 in terms of the change in hardness (ΔHv) in the above test (3). No. 3 and No. 9 as steels according to the present invention, and No. 15 and No. 19 as comparative steels were checked for corrosion rates after the HAZ treatment in the above test (1). They were 0.055 g/(m²·h), 0.058 g/(m²·h), 0.172 g/(m²·h), and 0.185 g/(m²·h), respectively. Also, from these results it can be seen that the steels according to the present invention, which change little in hardness (ΔHv) after the HAZ treatment, suppress the formation of a sigma phase in heat-affected zones and possess a high corrosion resistance.

In the steels according to the present invention, the occurrence of a wrinkle flaw in hot working was suppressed, allowing for a product with good surface quality. In contrast, with No. 12 through 14 which possessed Cr content exceeding the range defined in the present invention, wrinkles occurred on the product surface, caused a worsening of quality and also a lowering of the yield.

A total evaluation based on the above test results is shown in Table 2. Steels marked "○" are judged to have adequate corrosion resistance, an acceptable change in hardness caused by the occurrence of a sigma phase due to the HAZ treatment, and a low occurrence of wrinkles resulting from hot working, while steels marked "●" are judged to be inadequate even if satisfying one of the criteria above. The results shown in this table prove that the duplex stainless steels according to the present invention are best suited for use in severe corrosive environments, such as urea manufacturing plants.

EFFECT OF THE INVENTION

The duplex stainless steels according to the present invention are superior in strength and resistance to overall corrosion, and exhibit high corrosion resistance in heat-affected zones. Furthermore, wrinkle flaws in hot working and a lowering of production yield are avoided. Therefore, the duplex stainless steels according to the present invention are most suitable for use in urea manufacturing plants.

The invention claimed is:

1. A duplex stainless steel for use in urea manufacturing plants, in mass%, consisting of C: 0.03% or less, Si: 0.5% or less, Mn: 2% or less, P: 0.04% or less, S: 0.003% or less, Cr: 26% or more, but less than 28%, Ni: 7.3-10%, Mo: 0.2-1.7%, W: more than 2%, but no more than 3%, N: more than 0.3%, but no more than 0.4%, with the balance being Fe and impurities, in which the content of Cu as an impurity is not more than 0.1%.

2. A duplex stainless steel for use in urea manufacturing plants, in mass%, consisting of C: 0.03% or less, Si: 0.5% or less, Mn: 2% or less, P: 0.04% or less, S: 0.003% or less, Cr: 26% or more, but less than 28%, Ni: 7.3-10%, Mo: 0.2-1.7%, W: more than 2%, but no more than 3%, N: more than 0.3%, but no more than 0.4%, one or more selected from Ca: 0.0001-0.01%, Ce: 0.0001-0.07%, and B: 0.0001-0.01%, and the balance being Fe and impurities, in which the content of Cu as an impurity is not more than 0.1%.

3. A duplex stainless steel according to claim 1, where in mass%, 0.05% or less of Al and 0.01% or less of O (oxygen) are contained as impurities.

4. A duplex stainless steel according to claim 1, wherein an increase in steel hardness is not more than 80 as calculated by an equation $$\Delta Hv = Hv1 - Hv2$$

where Hv1 represents Vickers hardness of the steel as solution treated which is subjected to the heat treatment of 800° C. for 30 minutes and subsequent water cooling, and Hv2 represents Vickers hardness of the steel as solution treated.

5. A urea manufacturing plant characterized in that at least one of stripper pipe, condenser pipe, reactor, and other piping is manufactured from the duplex stainless steel according to claim 1.

6. A welding material made of the duplex stainless steel according to claim 1.

7. A urea manufacturing plant characterized in that at least one of stripper pipe, condenser pipe, reactor, and other piping is manufactured from the duplex stainless steel according to claim 2.

8. A welding material made of the duplex stainless steel according to claim 2.

9. A duplex stainless steel according to claim 2, where in mass%, 0.05% or less of Al and 0.01% or less of O (oxygen) are contained as impurities.

10. A duplex stainless steel according to claim 2, wherein an increase in steel hardness is not more than 80 as calculated by an equation $$\Delta Hv = Hv1 - Hv2$$

where Hv1 represents Vickers hardness of the steel as solution treated which is subjected to the heat treatment of 800° C. for 30 minutes and subsequent water cooling, and Hv2 represents Vickers hardness of the steel as solution treated.

11. A duplex stainless steel according to claim 3, wherein an increase in steel hardness is not more than 80 as calculated by an equation $$\Delta Hv = Hv1 - Hv2$$

where Hv1 represents Vickers hardness of the steel as solution treated which is subjected to the heat treatment of 800° C. for 30 minutes and subsequent water cooling, and Hv2 represents Vickers hardness of the steel as solution treated.

12. A urea manufacturing plant characterized in that at least one of stripper pipe, condenser pipe, reactor, and other piping is manufactured from the duplex stainless steel according to claim 3.

13. A welding material made of the duplex stainless steel according to claim 3.

14. A urea manufacturing plant characterized in that at least one of stripper pipe, condenser pipe, reactor, and other piping is manufactured from the duplex stainless steel according to claim 4.

15. A welding material made of the duplex stainless steel according to claim 4.

* * * * *